June 3, 1969 R. S. BENNIN 3,447,371
IN-SITU VELOCIMETER

Filed April 20, 1967

Sheet _1_ of 4

INVENTOR.
Robert S. Bennin

United States Patent Office 3,447,371
Patented June 3, 1969

3,447,371
IN-SITU VELOCIMETER
Robert S. Bennin, Spring Valley, N.Y., assignor, by mesne assignments, to the United States of America as represented by the Secretary of the Navy
Filed Apr. 20, 1967, Ser. No. 634,036
Int. Cl. G01w 1/00
U.S. Cl. 73—170                           8 Claims

ABSTRACT OF THE DISCLOSURE

An in-situ velocimeter is provided for measuring and recording the velocity of sound propagation through the ocean floor. The velocimeter consists of a disposable free-fall vehicle, a buoyant retrievable vehicle and an ejection-release mechanism. The free-fall vehicle comprises a cylinder having three hollow legs two of which receive acoustic transducers and the third a plastic tube for taking core samples of sediment. The plastic tube and the transducers are removable from the hollow legs through attachment to a net which encloses the buoyant retrievable vehicle. Recording equipment and electronic circuitry for transmitting radio signals are housed in two of three spheres comprising the buoyant retrievable vehicle.

---

The invention described herein may be manufactured and used by or for the Government of the United States of America for governmental purposes without the payment of any royalties thereon or therefor.

The invention relates to sediment velocimeters and more particularly to such a velocimeter which may descend in free-fall from a ship to the bottom and be recovered with recordings of velocity and a sample core without need of a winch, cable and associated gear on board ship.

Samples of the ocean floor conventionally are taken by devices which must be lowered from a vessel or platform and retrieved by winding the exceedingly great lengths of cable necessary to reach significant depths. The samples obtained are subsequently studied in a laboratory for sound propagation characteristics and a general classification of physical properties. Although it is possible to make in-situ measurements by these devices, it is awkward, lengthy and expensive to do so with the not unusual result that very few measurements have been made by current devices and methods. Samples and measurements made through the use of submersibles such as the bathyscaphe *Trieste* are too costly and infrequent to be of benefit to the overall effort involved. The most severe limitation of present methods, however, is that once the sediment is disturbed by removal from the ocean floor, subsequent laboratory analysis cannot reproduce the true environmental conditions for reliable velocity measurements.

Obviously the number of drops that can be made from a given ship is limited by the amount of time required to lower and raise the instruments in great depths of water. Further limitations are those arising from sea conditions which may either prevent the lowering of corer devices, lengthen their recovery time or result in loss of the lowered equipment. The present in-situ sediment velocimeter performs its functions without the need of any connection to the launching vessel, among other advantages over present methods and devices.

In summary, the present invention accomplishes the recovery of core samples and sediment velocimeter measurements through the use of a disposable free-fall vehicle in the form of a hollow container having three hollow legs which are affixed to a base spaced from one end of the container. A buoyant retrievable vehicle insertable within the container includes recoverable equipment such as a signal device, a data recording package, transducers and a core sample holder. An ejection-release mechanism provides for automatic release of the retrievable vehicle through both primary and auxiliary release means. The retrievable vehicle carries recoverable equipment to the surface.

Accordingly, it is an object of the present invention to provide a sediment velocimeter which permits velocimeter measurements to be taken at great depths without the need for a deep-sea winch and associated rigging.

Another object of this invention is to provide a sediment velocimeter which may record in-situ over a selected period of time the environmental compressional wave velocity at the water-sediment interface of a body of water and recover this information independent of mechanical, sonar or electronic attachment or command with the transporting vessel.

A further object of this invention is to provide a method of and means for retrieving core samples and sound velocity measurements in the undisturbed environment of a selected ocean bottom area.

Other objects, advantages and novel features of the invention will become apparent from the following detailed description thereof when considered in conjunction with the accompanying drawings in which like numerals represent like parts throughout and wherein.

Figure 1:
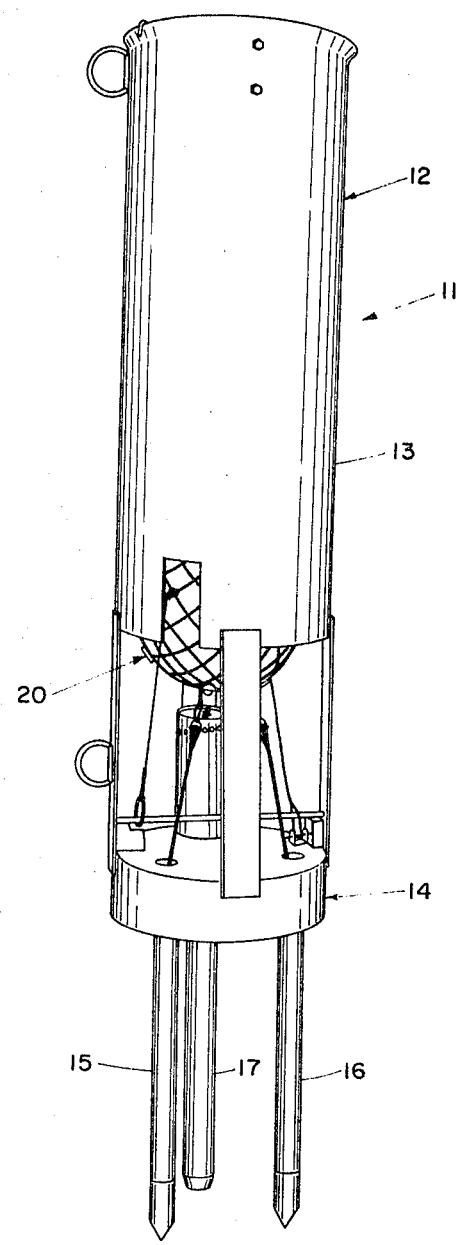
FIG. 1 is a perspective view of the composite free-fall vehicle and buoyant retrievable vehicle of the present invention.
Figure 2:
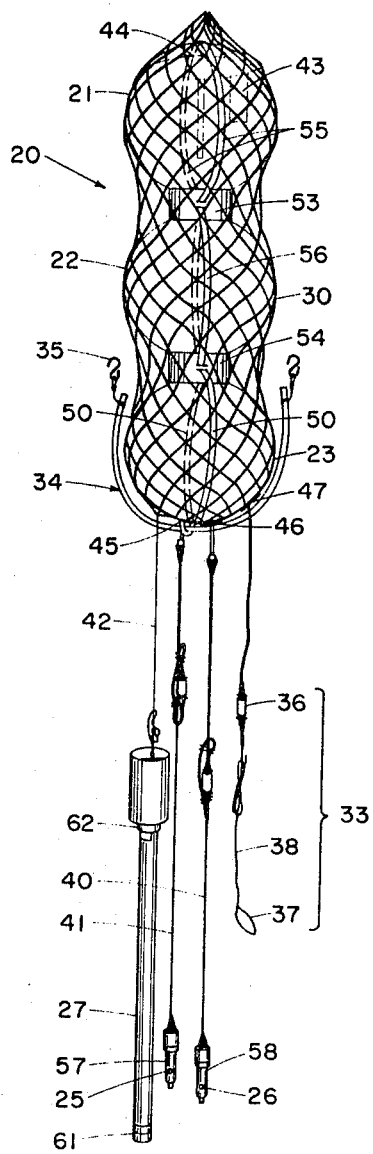
FIG. 2 is a perspective view of the buoyant retrievable vehicle components including the ejection mechanism.

Referring to the drawings, FIG. 1 is an illustration of the composite free-fall and buoyant retrievable veheicle 11 in condition for launching from a surface vessel. Composite vehicle 11 includes free-fall vehicle 12 which comprises a cylindrical container portion 13 and a base portion 14 for supporting a plurality of hollow legs 15, 16 and 17. Partly in view within container 13 is the buoyant retrievable vehicle 20 which, as shown in FIG. 2, includes a plurality of buoyancy means such as spheres 21, 22 and 23 and retrievable equipment including a pair of sensing means such as transducers 25 and 26 and core sample retrieving means such as a core barrel 27 each attached to securing means such as a net 30 encompassing the buoyancy means.

An ejection-release means 33 is provided which preferably includes a length of surgical rubber tubing 34 adapted to be attached to container 13 by connecting means such as hooks 35 and 36. The ejection-release means also includes a dissolving link 37 which is affixed to the remote end of a hold-down means such as electrical dissolving link connecting wire 38. Transducers 25 and 26 are tied to netting 23 preferably by connecting cable and conductive means 40 and 41, which preferably are of different length, while core barrel 27 preferably is tied to the netting by tether means such as cable 42.

Figure 3:
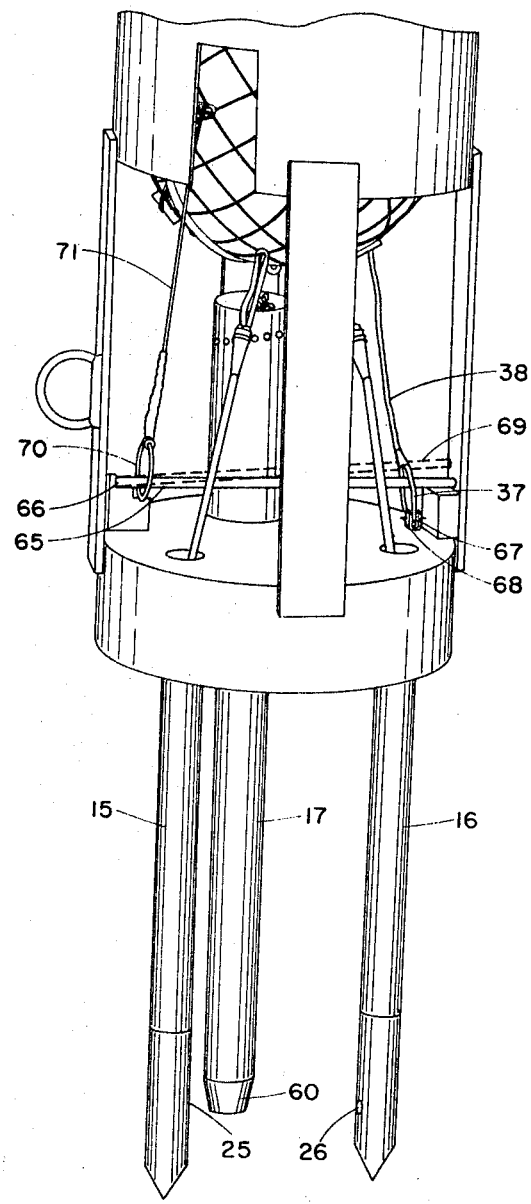
FIG. 3 is an enlarged perspective view of the interconnecting components of the free-fall vehicle and buoyant retrievable vehicle.

In FIG. 3 the operative elements and interconnecting components of the free-fall vehicle 12 and the buoyant retrievable vehicle 20 are shown in enlarged view. The components in FIG. 3 are substantially in the position during which compressional wave velocity measurements at the water-sediment interface are taken by means of transducers 25 and 26. These transducers are connected to energizing and recording means, not shown, in sphere 23 to provide for transmission of sound from one of the transducers and reception at the other so that the compressional wave velocity may be obtained knowing the space between the transducers and the time between transmission and reception. Cable means 40, 41 and 42 include the conductive means for relaying signal information to sphere 23 as well as cable means for physically removing the transducers and core barrel from the respective hollow legs at the conclusion of a recording period.

Spheres 21, 22 and 23 provide housing for recovery means such as a strobe light 43 and a radio transmitter 44 preferably installed in 21, and data recording means including a tape recorder, electronic circuitry, a sequence timing motor, an electrical release mechanism and battery power, none of which are shown in detail, installed in sphere 23. Attached to sphere 23 and the respective equipment therein through electrical watertight feedthroughs 45, 46 and 47 are, respectively, transducers 25 and 26 and electrical dissolving link connecting wire 38. Sphere 23 preferably is made of two hemispheres squeezed together by hose clamps 50, stopcock grease preferably being used as a gasket material between the spheres. The data recording package which is included in sphere 23 requires only a fraction of the sphere volume leaving a significant volume for buoyancy. Sphere 22 preferably is a fixed empty sphere whose function is to provide additional buoyancy. Of course, additional instrumentation may be included in this sphere if desired. The recovery means in sphere 21 preferably includes the combination self-activated strobe light 43 for night recovery and the radio transmitter 44 for direction finding for both night and day recovery. The three spheres preferably are mounted in tandem in vertical alignment and are connected by spacer and connecting means 53 and 54, respectively. Hose clamps 55 and 56 may be included to further seal the spheres and secure them to the spacer means 53 and 54. Spheres 21, 22 and 23 may be made of any suitable substance such as glass or aluminum, aluminum spheres being preferable since glass spheres tend to break under pressure despite pretesting. Since the wall thickness of aluminum spheres is nearly double that of glass for the same buoyancy due to the strength of glass under compression, larger aluminum spheres are necessary to provide equivalent buoyancy to that which glass spheres would provide.

The three spheres are connected and enmeshed in netting 23 as shown in FIG. 2, and the cable leads also are connected in the manner shown, before retrievable vehicle 20 is coupled to free-fall vehicle 12. Transducers 25 and 26 are contained in respective housings 57 and 58 which are lowered into hollow legs 15 and 16, respectively, and core barrel 27 is lowered into hollow leg 17. Housings 57 and 58 have windows, not shown, in legs 15 and 16 which are positioned facing one another for direct passage of compressional wave signals. The housings are seated in probe guides, not shown, in legs 15 and 16 and are held therewithin by conventional means such as set screws having spring-loaded detents, not shown, which are urged into mating recesses in respective housings. The probe guides preclude the transducers from becoming misaligned when the free-fall vehicle impacts on the ocean floor. Leg 17 is tapered as indicated at 60 to aid in insertion into the sediment, this leg also having an interior flange, not shown, upon which the bottom flange 61 of the core barrel rests. The core barrel is centered lengthwise in leg 17 by a tapering surface as indicated at 62.

With the vehicles coupled as shown in FIG. 3, dissolving link 37, which is attached to netting 23 by a connecting wire 38, is passed over a release arm 65 which is pivotable at one end as indicated at 66. Dissolving link 37 is then inserted within a slotted auxiliary release means 67 after which a dissolving pin 68, preferably made of magnesium, is inserted through the loop of dissolving link 37. Release arm 65 under normal operating conditions is canted in the position indicated at 69, arm 65 having been brought to this position by an upward pull exerted through netting 23, a hold-down ring 70 and a connecting cable 71 by tubing 34 and the buoyancy of spheres 21, 22 and 23. Further pivoting upward of arm 69 is restrained by dissolving link 37 which is held in place by dissolving pin 68.

Retrievable vehicle 20 is maintained under tension in the operable position by tubing 34 to provide, upon sudden release, an initial upward force for aid in unseating transducers 25 and 26 and core barrel 27 from their positions in the free-fall vehicle. Dissolving link 37 restrains arm 65 from further canting until the link is opened or pin 68 is dissolved. The plastic liner which constitutes core barrel 27 is placed in the core barrel guide, i.e. leg 17, and locked in position with a detent means, not shown, which means is disengaged when vehicle 20 is retrieved. Magnesium pin 68 is so dimensioned as to dissolve a selected interval after the electrical system should release retrievable vehicle 20. In the event of a power failure, magnesium pin 68 thus would go into solution releasing dissolving link 37. Balanced free-fall of the composite vehicle 11 is achieved through balancing of the cross-sectional areas of the two transducers carrying legs 15 and 16 and leg 17 carrying core barrel 27. Such balancing provides hydrodynamic stability during free-fall and avoids a need for appendages such as vanes or tubes which are not only costly and bulky but may cause oscillations during descent. The present embodiment as observed during descent has been noted to remain vertical and to achieve a speed of fall, i.e., for a weight of 150 pounds in water of 18 nautical miles per hour. Such a rate of fall minimizes or eliminates deflection due to horizontal currents.

Figure 4:
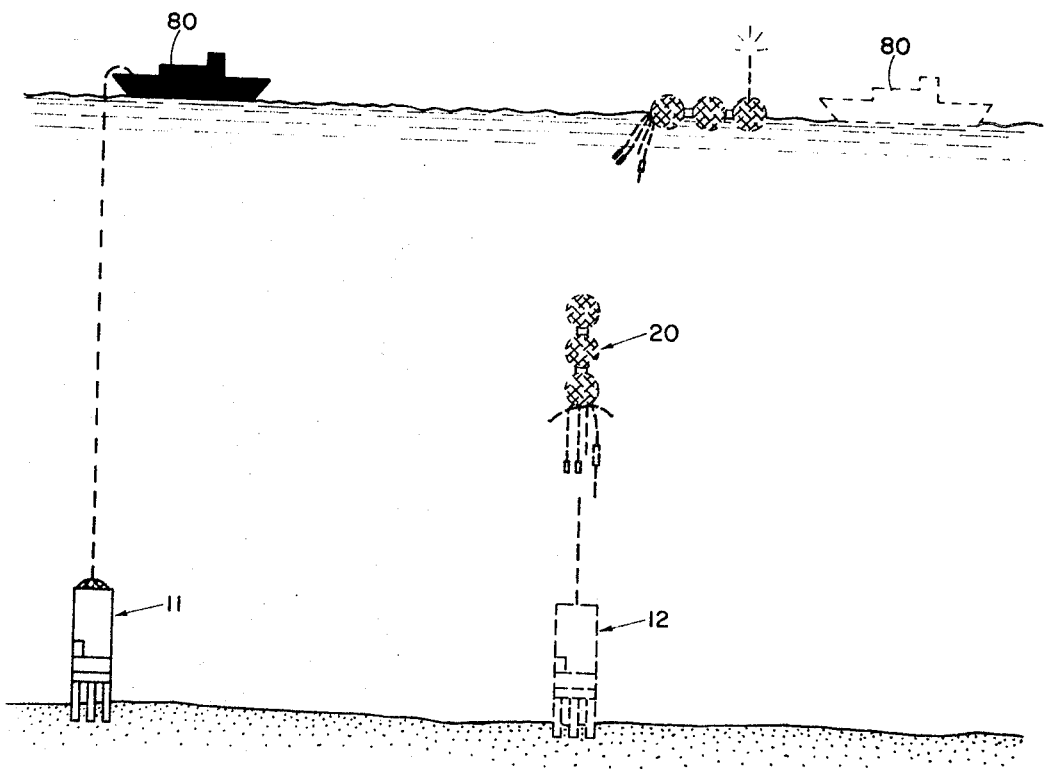
FIG. 4 is a schematic drawing illustrating the operation and use of the invention.

FIG. 4 indicates schematically the invention in operation showing the obvious advantages of having no connections, physical or in signal form, between a launching ship 80 and the composite vehicle 11. Upon reaching the surface, buoyant vehicle 20 transmits radio signals and is lighted by strobe light 43.

In operation, when retrievable vehicle 20 is housed in and secured to vehicle 12 through the release means at the base thereof, and the data recording system in sphere 23 is activated, composite vehicle 11 is released at the surface. Vehicle 11 then free-falls in a substantially vertical attitude through the water column until the three legs 15, 16 and 17 are implanted in the ocean floor sediment. Implantation to a depth of substantially 18 inches is achieved in the present embodiment of the invention. The data recording system having been in operation during descent, a tape recording is made throughout free-fall as well as during subsequent penetration into the bottom.

The tape recording made during free-fall provides a realtive calibration for the water-sediment velocity. Since a minimum tape recording period of preferably 30 minutes from the time of activation at the surface is desired, the time of recording at the bottom ordinarily is from 12 to 15 minutes at depths of from 640 to 450 feet. At the end of the representative recording time of 30 minutes, the sequence timer in sphere 23 electrically separates the buoyant vehicle from the free-fall vehicle by permitting the necessary current to flow through dissolving link 37. Upon release of the non-pivoting end of arm 65, ejection release means 34 and the reserve buoyancy of spheres 21, 22 and 23 withdraws the transducer probes and the core barrel with sample from base 14 of vehicle 12.

Through the present invention, a core sample and a velocimeter recording can be obtained at a 20,000 foot depth of water in less than two hours. The advantage gained is roughly one-fifth the time of conventional lowering and hoisting methods plus the economic advantages of the absence of lowering and hoisting gear.

What is claimed is:

1. A composite free-fall and buoyant retrievable vehicle for obtaining samples and data from an undisturbed ocean botom environment comprising:

vehicle means for transporting a payload to the bottom of a body of water, said vehicle means including means for releasably receiving a paylod,
  said receiving means configured to provide hydrodynamic stability of said vehicle means during free-fall and to implant said vehicle means in a substantially vertical attitude in the bottom;
  said receiving means including a plurality of depending members having a balanced cross-sectional area for stabilizing the composite vehicle during free-fall;
  at least two of said receiving means receiving transducer means in facing relationship therein so that data relative to tarnsmission characteristics may be obtained of the matter disposed therebetween,
a payload including data sensing and recording means, sample retaining means, ejection means, buoyancy means and surface position identifying means inserted within and releasably tethered to said vehicle means; and
  said payload further including timing means for actuating said ejection means after a selected interval,
    whereby said data sensing and recording means and said sample retaining means are separated from said vehicle means at the conclusion of said interval and carried to the surface where said identifying means aids in their recovery.

2. The device of claim 1 wherein said transducer means are retrievably retained in said receiving means by detent means;
  said detent means overcome by the force exerted upon actuation of said ejection means.

3. The device of claim 2 wherein said data sensing and recording means are set in operation before release of the composite vehicle at the surface;
  said data sensing and recording means operable until actuation of said timing means;
  said ejection means including means tethering said payload to said vehicle means;
  said tethering means having a portion dissolvable in water upon passage of electric current therethruogh; and
  said timing means connected to said dissolvable portion so that upon actuation of said timing means current is caused to flow through said dissolvable portion dissolving it and permitting actuation of said ejection means.

4. In a composite free-fall vehicle and retrievable vehicle having a payload comprising a data recording system, a pair of transducers, botom sampling means, release means, buoyancy means and surface recovery means the combination therewith of:
  a plurality of spheres comprising said buoyancy means and individually containing said recording system and said recovery means;
  a plurality of depending means attached to the free-fall vehicle and adapted to releasably receive said transducers and said botom sampling means;
  said free-fall vehicle having a cylindrical upper portion adapted to receive said plurality of spheres and a base portion to which said depending means are attached;
  a plurality of means electrically connecting said recording system to said transducers and said release means to said free-fall vehicle;
  said means electrically connecting said release means to said free-fall vehicle adapted to physically connet each so that the release means may be actuated upon electric current flowing therethrough for a selected interval; and
  said payload also including timing means and conductive means connecting said timing means to said release means so as to actuate the release means a selected interval after the composite vehicle has been released for free-fall.

5. The device of claim 4 and further including releasable retention means connecting said buoyancy means to the base portion of said free-fall vehicle;
  said retention means including an arm pivotally connected at one end to said base portion; and
  said retention means further including tether means secured to said buoyancy means at one end and slidably engaging said arm at the other end, said tether means being under tension when the composite vehicle is submerged so that separation of said vehicles is precluded;
  said release means when actuated freeing the other end of said arm and permitting the other end of said tether means to become disengaged from said arm.

6. The device of claim 5 wherein said release means is releasably engaged with said free-fall vehicle by means soluble within a selected interval;
  said soluble means when dissolved effecting release of the other end of said arm and permitting disengagement of said tether means from said arm.

7. The method of obtaining in-situ sound propagation velocity measurements of the ocean floor comprising the steps of:
  positioning a pair of tarnsducers opposite each other in spaced sediment penetrating means;
  delivering buoyantly housed recording means connected to said transducers to the ocean floor;
  withdrawing said transducers from said penetrating means at the end of a selected period of time; and
  floating said buoyantly housed recording means and said transducers to the surface where they may be recovered.

8. The method of claim 7 and further including the step of transmitting direction finding signals at the surface to facilitate recovery.

References Cited

UNITED STATES PATENTS

| | | | |
|---|---|---|---|
| 3,203,236 | 8/1965 | Prince | 73—170 X |
| 3,273,111 | 9/1966 | Parenti | 73—170 X |
| 3,287,753 | 11/1966 | Race | 340—5 |
| 3,293,676 | 12/1966 | Link | 9—8 |

BENJAMIN A. BORCHELT, *Primary Examiner.*

GERALD H. GLANZMAN, *Assistant Examiner.*

U.S. Cl. X.R.

181—.5; 340—5